US012687923B2

(12) United States Patent
Iwagami et al.

(10) Patent No.: US 12,687,923 B2
(45) Date of Patent: Jul. 21, 2026

(54) ELECTRONIC DEVICE AND CONTROL METHOD OF ELECTRONIC DEVICE

(71) Applicant: CANON KABUSHIKI KAISHA, Tokyo (JP)

(72) Inventors: Takuma Iwagami, Kanagawa (JP); Sho Ichikawa, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/823,828

(22) Filed: Sep. 4, 2024

(65) Prior Publication Data

US 2025/0085775 A1 Mar. 13, 2025

(30) Foreign Application Priority Data

Sep. 12, 2023 (JP) ................................. 2023-147493

(51) Int. Cl.
| | |
|---|---|
| *G06F 3/01* | (2006.01) |
| *G02B 27/00* | (2006.01) |
| *G02B 27/01* | (2006.01) |
| *G06F 3/041* | (2006.01) |

(52) U.S. Cl.
CPC ......... *G06F 3/013* (2013.01); *G02B 27/0093* (2013.01); *G02B 27/017* (2013.01); *G02B 27/0179* (2013.01); *G06F 3/041* (2013.01); *G02B 2027/0187* (2013.01)

(58) Field of Classification Search
CPC ..... G06F 3/013; G06F 3/041; G02B 27/0093; G02B 2027/0187; G02B 27/017; G02B 27/0179
See application file for complete search history.

(56) References Cited

U.S. PATENT DOCUMENTS

| | | | | |
|---|---|---|---|---|
| 2014/0152539 A1* | 6/2014 | Cai | ........................ | G06F 3/0304 |
| | | | | 345/156 |
| 2014/0347265 A1* | 11/2014 | Aimone | .................. | G06F 3/015 |
| | | | | 345/156 |
| 2015/0302247 A1* | 10/2015 | Mohanakrishnan | ... | G06Q 10/00 |
| | | | | 382/218 |
| 2016/0187976 A1 | 6/2016 | Levesque et al. | | |

FOREIGN PATENT DOCUMENTS

| | | |
|---|---|---|
| JP | 2016126773 A | 7/2016 |
| JP | 2017111550 A | 6/2017 |

* cited by examiner

*Primary Examiner* — Cory A Almeida

(74) *Attorney, Agent, or Firm* — Venable LLP

(57) ABSTRACT

An electronic device according to the present invention includes a processor, and a memory storing a program which, when executed by the processor, causes the electronic device to perform display processing in which any one of a plurality of pages included in content is displayed, perform obtainment processing in which line-of-sight information relating to a user looking at the displayed page is obtained, and perform control processing in which control is performed to provide a predetermined notification in a case where an operation for advancing a page to be displayed to a next page is performed by the user before a condition regarding a line of sight based on the line-of-sight information obtained by the obtainment processing is satisfied.

20 Claims, 12 Drawing Sheets

409

409

ELECTRONIC DEVICE AND CONTROL METHOD OF ELECTRONIC DEVICE

BACKGROUND OF THE INVENTION

Field of the Invention

The present invention relates to an electronic device and a control method of the electronic device, and more particularly to a technique for performing control based on information about a user's line of sight.

Description of the Related Art

Various types of content that can be displayed are known, such as content for purchase (e.g., electronic commerce), content for education (e.g., e-learning), and content for entertainment (e.g., electronic books). As a technology relating to content display, a technology has been proposed that uses information about a user's line of sight. Japanese Patent Application Publication No. 2016-126773 discloses a technology for opening and closing a window or playing a haptic effect in response to a gaze on an image. Japanese Patent Application Publication No. 2017-111550 discloses a technology that, on the basis of the distribution of line-of-sight positions in reading a displayed document, performs calibration of line-of-sight detection and provides a notification according to the proportion of the part that has been read in the document.

However, the viewer of content may cause a page (screen) of content to transition to a next page without sufficiently viewing the text or images that the content provider prepared in hopes of sufficient viewing by viewers. This problem cannot be solved with the techniques disclosed in Japanese Patent Application Publication No. 2016-126773 and Japanese Patent Application Publication No. 2017-111550.

SUMMARY OF THE INVENTION

The present invention provides a technique that causes a viewer of content to view content in accordance with the intention of the content provider.

The present invention in its first aspect provides an electronic device including a processor, and a memory storing a program which, when executed by the processor, causes the electronic device to perform display processing in which any one of a plurality of pages included in content is displayed, perform obtainment processing in which line-of-sight information relating to a user looking at the displayed page is obtained, and perform control processing in which control is performed to provide a predetermined notification in a case where an operation for advancing a page to be displayed to a next page is performed by the user before a condition regarding a line of sight based on the line-of-sight information obtained by the obtainment processing is satisfied.

The present invention in its second aspect provides a control method of an electronic device, including displaying any one of a plurality of pages included in content, obtaining line-of-sight information relating to a user looking at the displayed page, and performing control to provide a predetermined notification in a case where an operation for advancing a page to be displayed to a next page is performed by the user before a condition regarding a line of sight based on the obtained line-of-sight information is satisfied.

The present invention in its third aspect provides a non-transitory computer readable medium that stores a program, wherein the program causes a computer to execute a control method of an electronic device, the control method including displaying any one of a plurality of pages included in content, obtaining line-of-sight information relating to a user looking at the displayed page, and performing control to provide a predetermined notification in a case where an operation for advancing a page to be displayed to a next page is performed by the user before a condition regarding a line of sight based on the obtained line-of-sight information is satisfied.

Further features of the present invention will become apparent from the following description of exemplary embodiments with reference to the attached drawings.

DESCRIPTION OF THE EMBODIMENTS

Referring to the accompanying drawings, embodiments of the present invention are described in detail below. In the following example, the present invention is applied to a wearable device such as a head-mounted display (HMD), but electronic devices to which the present invention is applicable are not limited to wearable devices. For example, the present invention is applicable to non-wearable display devices such as smartphones, tablet terminals, or notebook personal computers. The present invention is also applicable to an information processing device connected to a display device, such as a personal computer or a server connected to an HMD.

Figure 1:
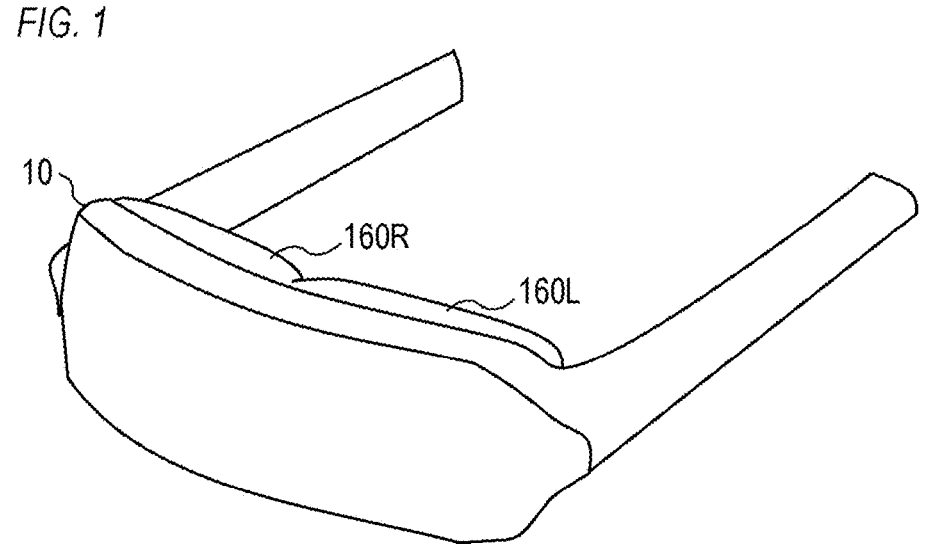
FIG. 1 is an external view of a wearable device.

FIG. 1 is an external view of a wearable device 10 as an example of an electronic device to which the present invention is applicable. A right display unit 160R is a display unit for the right eye, and a left display unit 160L is a display unit for the left eye. Each of the right and left display units 160R and 160L includes an eyepiece unit 16, an electric viewfinder (EVF) 29, an infrared-light emitting diode 58, and an eyeball-detecting unit 161, which will be described below. The user wearing the wearable device 10 views the image displayed on the right display unit 160R (right image) with his/her right eye and the image displayed on the left display unit 160L (left image) with his/her left eye.

Figure 2:
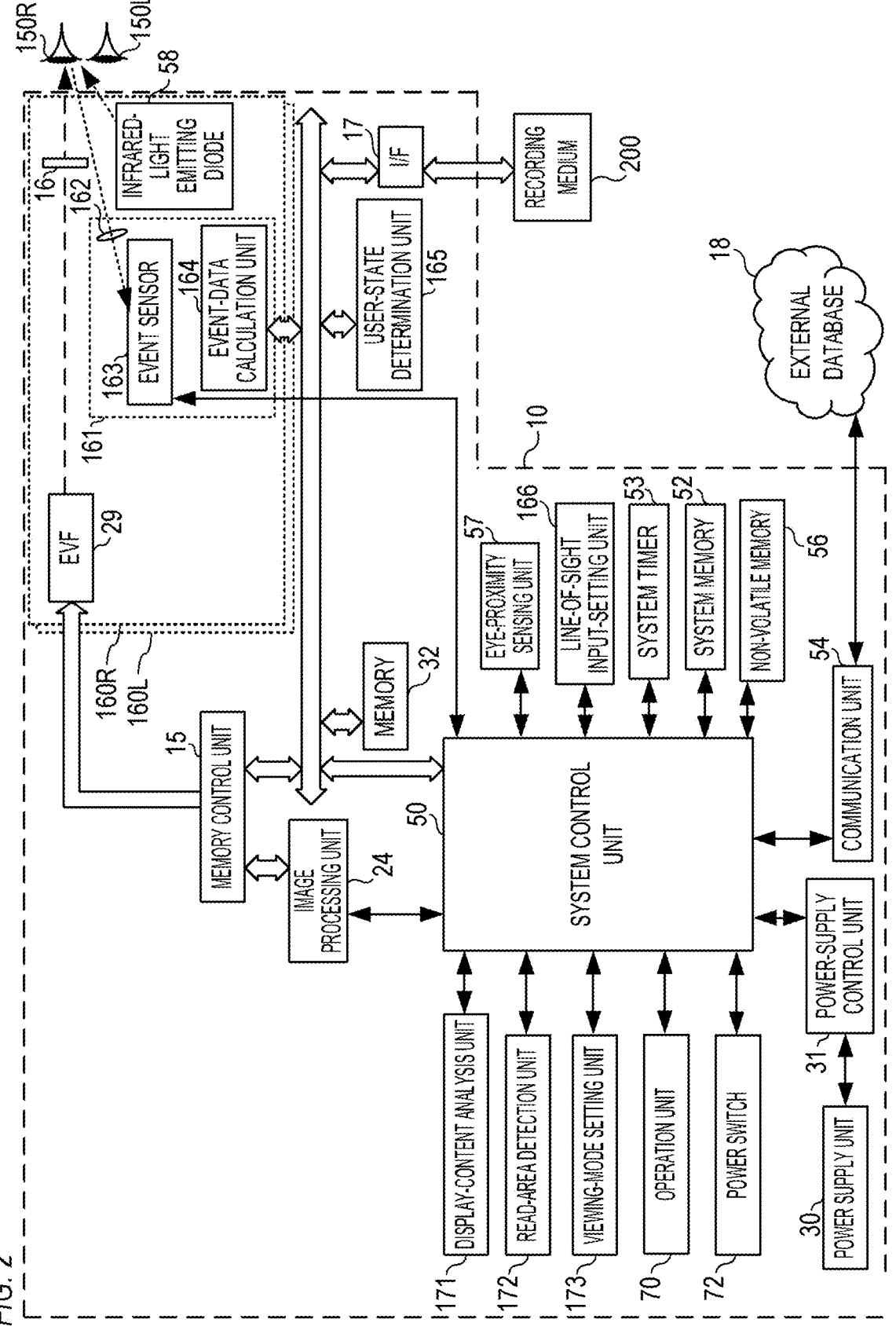
FIG. 2 is a block diagram showing an example of the configuration of a wearable device.

FIG. 2 is a block diagram showing an example of the configuration of the wearable device 10.

An image processing unit 24 performs predetermined processing (e.g., pixel interpolation, resizing such as reduction, and color conversion) on data received from a memory control unit 15, which will be described below.

The memory control unit 15 controls the transmission and reception of data between the image processing unit 24, a memory 32, and a system control unit 50.

The memory 32 is a memory for displaying images (video memory). The image data for display written in the memory 32 is displayed on the EVF 29 via the memory control unit 15.

The EVF 29 performs display on a display device, such as an LCD or an organic EL display, in response to a signal from the memory control unit 15. The image data stored in the memory 32 is sequentially transferred to the EVF 29 for display, thereby enabling playback and display of moving images.

An eyepiece unit 16 is an eyepiece of an eyepiece finder (a look-in finder), and the user can view an image displayed on the EVF 29 through the eyepiece unit 16.

A non-volatile memory 56 is a memory that is electrically erasable and recordable, such as a Flash-ROM. The non-volatile memory 56 stores various types of information (data) such as constants and programs for operating the system control unit 50. These programs are used to perform processes of various flowcharts, which are described below.

The system control unit 50 is a control unit including at least one processor or circuit and controls the entire wearable device 10. The system control unit 50 performs various processes, which will be described below, by executing a program stored in the non-volatile memory 56. A system memory 52 may be a RAM, for example, and the system control unit 50 loads various types of information (data) such as the constants and variables for the operation of the system control unit 50 and a program read from the non-volatile memory 56 in the system memory 52. The system control unit 50 also performs display control by controlling different units including the memory 32 and the EVF 29.

A system timer 53 is a time-measuring unit that measures time used for various controls and the time of the built-in clock.

An operation unit 70 includes various types of operation members serving as input units for receiving operation (user operation) from the user. For example, the operation unit 70 includes a voice UI or a touchpad. The touchpad is mounted on a side face (not shown) of the wearable device 10. The system control unit 50 can detect operations on the touchpad or the state of the touchpad. The system control unit 50 is notified of the position coordinates where a finger touches the touchpad via the internal bus. Based on the notified information, the system control unit 50 determines what type of user operation (touch operation) has been performed on the touchpad. The touchpad may adopt any touchpad system among various systems including a resistive system, a capacitive system, a surface acoustic wave system, an infrared system, an electromagnetic induction system, an image recognition system, and an optical sensor system.

A power switch 72 is an operation member that switches the power of the wearable device 10 between ON and OFF.

A power-supply control unit 31 includes a plurality of components (circuits) such as a battery-detecting circuit, a DC-DC converter, and a switching circuit for switching between blocks to be energized, and detects whether a battery is mounted, the type of the battery, the remaining battery level. Additionally, the power-supply control unit 31 controls the DC-DC converter on the basis of the detection results and an instruction from the system control unit 50, and supplies respective units, including a recording medium 200, with necessary voltage for a necessary period of time.

The power supply unit 30 includes a primary battery such as an alkaline battery or a lithium battery, a secondary battery such as a NiCd battery, a NiMH battery, or a lithium-ion battery, or an AC adapter.

A recording medium I/F 17 is an interface with a recording medium 200, which may be a memory card or a hard disk. The recording medium 200 stores moving image files for playback or for recording viewing information, and includes a semiconductor memory or a magnetic disk.

A communication unit 54 transmits and receives video signals and audio signals to and from an external device connected wirelessly or by cable. The communication unit 54 can also transmit and receive data to and from an external database server. The communication unit 54 can also be connected to a wireless local area network (LAN) or the Internet. Additionally, the communication unit 54 can also communicate with an external device via Bluetooth (registered trademark) or Bluetooth Low Energy. For example, the communication unit 54 receives download content from an external database 18.

An eye-proximity sensing unit 57 is a wearing-detecting sensor that detects whether the wearable device 10 is worn by a user. The system control unit 50 can switch between starting (power on) and stopping (power off) the wearable device 10 depending on the state detected by the eye-proximity sensing unit 57. The eye-proximity sensing unit 57 may be configured to detect an approach of an object to the eyepiece unit 16 using an infrared proximity sensor, for example. When an object is in proximity, infrared rays projected from the light-projecting unit (not shown) of the eye-proximity sensing unit 57 are reflected and received by the light-receiving unit (not shown) of the infrared proximity sensor. It is also possible to determine how close the object is to the eyepiece unit 16 from the amount of infrared light received. The infrared proximity sensor is merely an example, and the eye-proximity sensing unit 57 may be another sensor such as a capacitance type sensor.

An eyeball-detecting unit 161 includes an eyeball-detecting lens 162, an event sensor 163, and an event-data calculation unit 164, which will be described below. The eyeball-detecting unit 161 is capable of obtaining eyeball information about the state of the user's eyes (right eye 150R and left eye 150L) looking through the viewfinder.

The infrared light emitted from the infrared-light emitting diode 58 is reflected on the user's eye, and the reflected infrared light passes through the eyeball-detecting lens 162 and forms an image on the imaging surface of the event sensor 163.

The event sensor 163 is an event-based vision sensor that detects a change in brightness of light incident on each pixel, and outputs information about a pixel with a brightness change asynchronously with other pixels. The data output from the event sensor 163 includes the position coordinates of the pixel where a change in brightness (event) has occurred, the polarity (positive or negative) of the brightness change, and timing information corresponding to the time when the event occurred, for example. This data will hereinafter be referred to as event data. Compared with a synchronous frame-based sensor such as an existing imaging unit, the event sensor 163 eliminates redundancy in the output information and has features such as high-speed operation, a high dynamic range, and low power consumption. On the other hand, since event data pieces (information about pixels with brightness changes) are output asynchronously with other pixels, special processing is required to determine the relationship between event data pieces. To determine the relationship between event data pieces, it is necessary to accumulate the event data pieces output from the event sensor 163 for a predetermined time and perform various arithmetic operations on the results.

The event-data calculation unit 164 is a calculation unit for obtaining (detecting) eyeball information on the basis of the event data pieces that are continuously and asynchronously output from the event sensor 163. For example, the event-data calculation unit 164 accumulates event data pieces that are created in a predetermined time and processes the data pieces as a set of data to obtain eyeball information. By changing the accumulation time for accumulating event data, a plurality of eyeball information with different occurrence speeds can be obtained. For example, the eyeball information may include line-of-sight position information about the line-of-sight position (the position where the user is looking), saccade information about the direction or speed of saccades, and microsaccade information about the frequency or amplitude of microsaccades (the amount of change in the line-of-sight position). Eyeball information may be interpreted as line-of-sight information about the user's line of sight. The eyeball information may include information about eyeball movements other than saccades and microsaccades, pupil information about the pupil size or changes in the pupil size, or blink information about the speed or the number of blinks. These information pieces are merely examples, and the eyeball information is not limited to these information pieces. The event-data calculation unit 164 may map the event data for the accumulation time as one frame of image data on the basis of the event occurrence coordinates (the position coordinates of the pixel at which a change in brightness (event) occurred), and perform image processing. This configuration allows eyeball information to be obtained from one frame of image data obtained by mapping event data for the accumulation time using frame-based image processing.

A user-state determination unit 165 is a determination unit that determines the state of the user on the basis of the eyeball information obtained by the event-data calculation unit 164. For example, the size (extent) of the viewing area or the degree of gazing (degree of perspective) can be determined from the frequency or amplitude of microsaccades. The viewing area may be interpreted as gazing area, attention area, or focus area. The degree of gazing is an index that is higher when the viewing area is smaller and lower when the viewing area is larger. The degree of perspective is defined as the antonym of the degree of gazing. The user-state determination unit 165 may be a neural network that receives parameters relating to eyeball information as input and outputs information relating to the above-mentioned user's state (hereinafter, user state information), for example. However, the configuration of the user-state determination unit 165 is not limited to the above configuration. The eyeball information used by the user-state determination unit 165 and the determination results of the user-state determination unit 165 are not limited to those described above.

A line-of-sight input-setting unit 166 sets whether to enable or disable the processing of the eyeball-detecting unit 161 through the system control unit 50. The line-of-sight input-setting unit 166 may set parameters and conditions relating to the processing of the event-data calculation unit 164 and the user-state determination unit 165. For example, the user can freely set these settings from a menu screen.

Also, the system control unit 50 can obtain information about the area of the EVF 29 and the size of the object being displayed. Furthermore, the eyeball-detecting unit 161 can also obtain information about which region of the EVF 29 the user is directing his or her line of sight (line-of-sight information). This enables the system control unit 50 to determine which object the user is looking at.

A display-content analysis unit 171 analyzes the display content. For example, the display-content analysis unit 171 obtains (downloads) content information using the communication unit 54, and detects the type, number, size, and position of objects such as illustrations, photographs, diagrams, or tables that are being displayed. The analysis method and the information obtained by the analysis are not limited to those described above. The analysis may include image processing such as template matching.

A read-area detection unit 172 detects the area of the content that is already read. A viewing-mode setting unit 173 sets the viewing mode. There are no particular limitations on the method for setting the viewing mode, and the viewing-mode setting unit 173 may set the viewing mode in response to a user operation on a menu screen, for example. In this embodiment, one of a plurality of viewing modes including a detailed reading mode and a skim reading mode can be set. In the detailed reading mode, the conditions for determining whether the text has been read (read conditions) are stringent, whereas in the skim reading mode, the read conditions are lenient.

First Embodiment

Referring to FIG. 3 and FIGS. 4A to 4D, a first embodiment of the present invention is now described.

Figure 3:
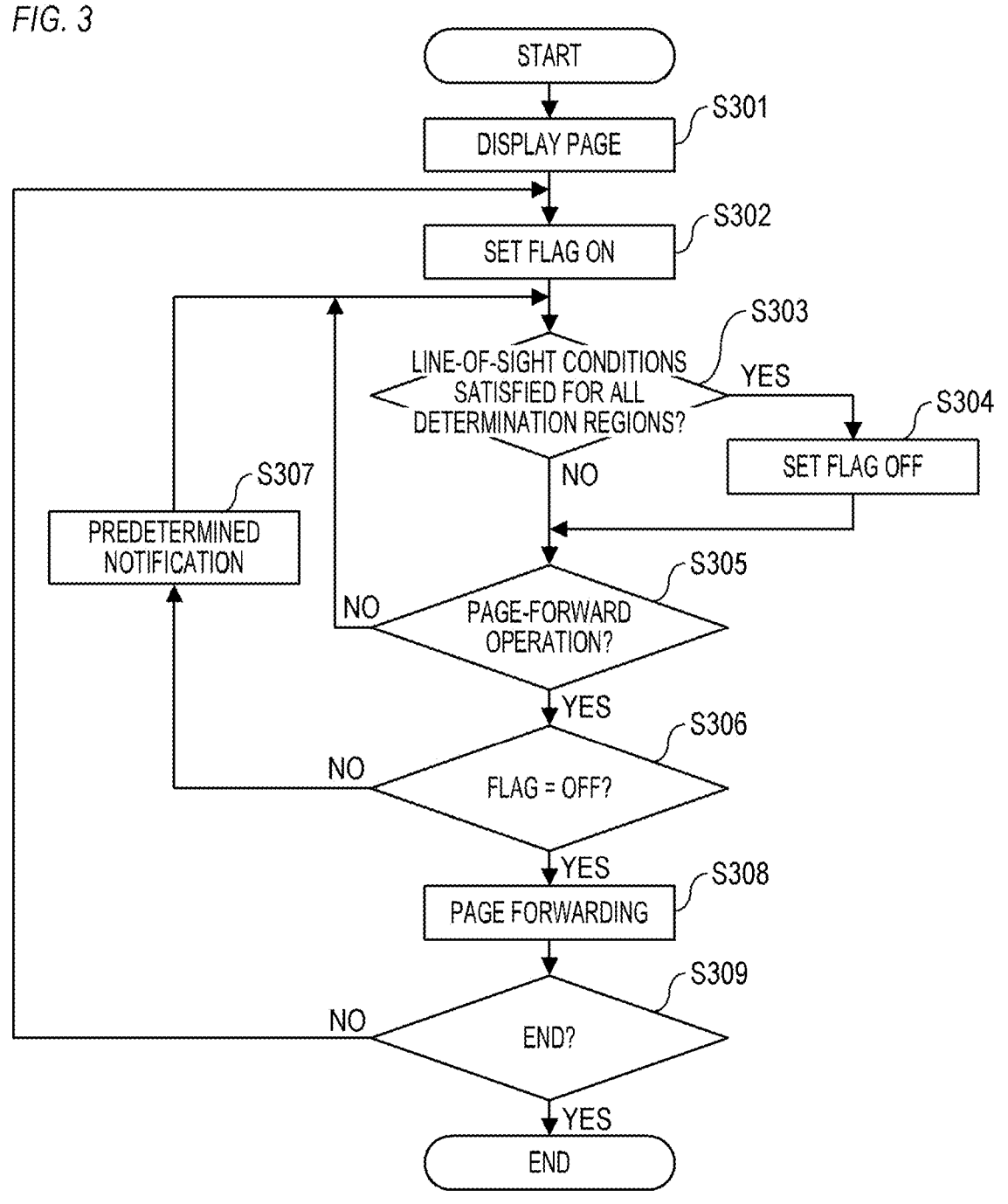
FIG. 3 is a flowchart illustrating an operation example according to a first embodiment.

FIG. 3 is a flowchart showing an example of an operation of the wearable device 10. The process of the flowchart of FIG. 3 is performed when the system control unit 50 loads a program stored in the non-volatile memory 56 into the system memory 52, executes the program, and controls the function blocks. When the user instructs to start displaying content using the operation unit 70, the system control unit 50 starts the operation shown in FIG. 3. The content includes a plurality of pages having a predefined display order. Each page includes a combination of image data written in the memory 32, for example.

At step S301, the system control unit 50 displays the Nth page of the content on the EVF 29. The Nth page may or may not be the first page. For example, the Nth page may be the page that was last displayed during the previous viewing of the content. Each page of the content except the final page includes an object (item) for advancing the page to be displayed to the next page. Hereinafter, an object for advancing the page to be displayed to the next page will be referred to as a page-forward object. When displaying content on the EVF 29, the system control unit 50 also displays on the EVF 29 a cursor indicating the user's operation position. The user can use the operation unit 70 to move the cursor displayed on the EVF 29.

At step S302, the system control unit 50 sets the page-forwarding prohibition flag stored in the system memory 52 to ON. If the page-forwarding prohibition flag is not stored in the system memory 52, the system control unit 50 stores a page-forwarding prohibition flag that is set to ON in the system memory 52.

At step S303, the system control unit 50 determines whether the line-of-sight condition, which is a predetermined condition regarding the user's line of sight, is satisfied for the displayed page. This determination is performed on the basis of the line-of-sight information obtained by the eyeball-detecting unit 161. The information on the line-of-sight conditions may be defined in the program, may be included in the content data, or may be managed separately from the program and the content.

In the first embodiment, it is assumed that a partial region of a page is predefined as a determination region. It is also assumed that a line-of-sight condition is predefined for the determination region. The determination region is a region that the content provider wants the user (content viewer) to sufficiently (reliably) view. The information of the determination region may be defined in the program, may be included in the content data, or may be managed separately from the program and the content. The information of the determination region may be obtained by analyzing the page. A page may have one determination region, or may have a plurality of determination regions. When one page has a plurality of determination regions, a plurality of line-of-sight conditions respectively corresponding to the plurality of determination regions are predefined. For example, the line-of-sight condition may be a condition that the time during which a line of sight is continuously directed to the determination region corresponding to the line-of-sight condition is greater than or equal to a predetermined time.

The system control unit 50 determines whether the line-of-sight conditions of all the determination regions are satisfied for the displayed page. If the line-of-sight conditions are satisfied for all determination regions, the process proceeds to step S304. If not (if there is a determination region for which the line-of-sight condition is not satisfied), the process proceeds to step S305.

It is preferable that a plurality of determination regions on one page do not overlap each other. This reduces the likelihood that the determination condition is satisfied for one determination region while another determination region is being viewed. Furthermore, the line-of-sight condition is not limited to the above condition. For example, the line-of-sight condition may be a condition that the line of sight is directed to the determination region corresponding to the line-of-sight condition. The line-of-sight condition may be a condition that the total time during which a line of sight is directed to the determination region corresponding to the line-of-sight condition is greater than or equal to a predetermined time. The line-of-sight condition may be a condition that the determination region corresponding to the line-of-sight condition receives attention. There are no particular limitations on the method of determining whether the determination region receives attention. The determination of whether the determination region receives attention may be the determination of whether the time during which a line of sight is continuously directed to the determination region is greater than or equal to a predetermined time, or the determination of whether the total time during which a line of sight is directed to the determination region is greater than or equal to a predetermined time. The line-of-sight condition may be a condition that the line of sight has moved across the entire displayed page. The line-of-sight condition may be any one of the above-mentioned conditions or a combination of two or more of them.

At step S304, the system control unit 50 sets the page-forwarding prohibition flag stored in the system memory 52 to OFF.

At step S305, the system control unit 50 determines whether a user operation (page-forward operation) for advancing the page to be displayed to the next page has been performed. For example, the page-forward operation may be a user operation of aligning the cursor displayed on the EVF 29 with the page-forward object and performing a tap on the touchpad (a touch operation where the user touches down and then immediately lifts the finger). If a page-forward operation has been performed, the process proceeds to step S306. If not, the process proceeds to step S303.

At step S306, the system control unit 50 determines whether the page-forwarding prohibition flag stored in the system memory 52 is OFF. If the page-forwarding prohibition flag is OFF, the process proceeds to step S308. If not, the process proceeds to step S307.

At step S307, the system control unit 50 provides a predetermined notification to the user. For example, the predetermined notification may be a notification that there is a determination region for which the line-of-sight condition is not satisfied. There are no particular limitations on the notification method. In the first embodiment, it is assumed that a predetermined notification is provided using the EVF 29. Step S307 may be omitted.

At step S308, the system control unit 50 advances the page to be displayed to the next page (page forwarding).

At step S309, the system control unit 50 determines whether to end the display of the content. If the display of the content is to be ended, the operation of FIG. 3 ends. If not, the process proceeds to step S302. For example, when a user operation is performed to select the end button included on the final page of the content, or when a user operation is performed to close the window displaying content, the system control unit 50 determines that the display of the content is to be ended. If there is no next page at step S308, the system control unit 50 also determines to end the display of the content.

FIGS. 4A to 4D are schematic diagrams showing examples of screens according to the first embodiment.

Figure 4A:
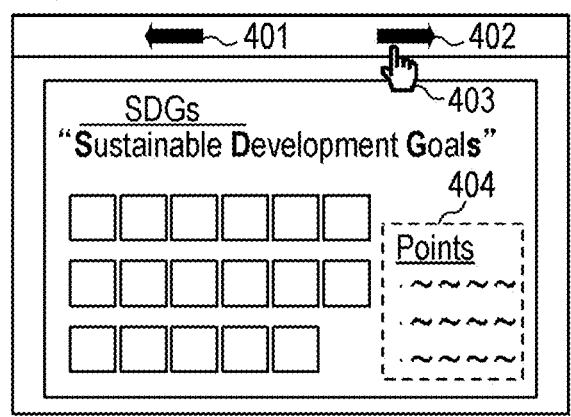
FIGS. 4A to 4D are schematic diagrams showing examples of screens according to the first embodiment.

FIG. 4A is a schematic diagram showing an example of a screen displayed on the EVF 29 at step S301 or step S308 in FIG. 3. The screen of FIG. 4A displays a page of e-learning content. The page of FIG. 4A includes object 401 and object 402. Object 401 is a page-back object for returning the page to be displayed to the previous page, and object 402 is a page-forward object for advancing the page to be displayed to the next page. A cursor 403 indicating the user's operation position is placed over the page of FIG. 4A. Region 404 on the page of FIG. 4A is a predefined determination region. The broken line indicating the determination region 404 is not displayed. When the touchpad of the operation unit 70 is tapped in the state shown in FIG. 4A (a state in which the cursor 403 is placed over the page-forward object 402), the system control unit 50 determines that a page-forward operation has been performed. Even if a page-forward operation is performed, the system control unit 50 does not advance the page to be displayed to the next page while the line-of-sight condition is not satisfied for the determination region 404. When a page-forward operation is performed after the line-of-sight condition of the determination region 404 is satisfied, the system control unit 50 advances the page to be displayed to the next page.

The content may be stored in the memory 32 in the wearable device 10, or may be stored in the recording medium 200. The content may be stored in the external database 18 on the Internet. In this case, any single page of the content is downloaded from the Internet via the communication unit 54. The downloaded page is then displayed on the EVF 29. The data of the downloaded page includes not only the image and text data to be displayed, but also link information to other pages. When the data of a page is downloaded, the information of the determination region regarding that page is also downloaded. The downloaded page data may include information of the determination region. Information on the line-of-sight condition may also be downloaded. Not only a single file containing data of a plurality of pages having a predefined display order, but also a collection of a plurality of pages connected by one or more link information pieces corresponding to the predefined display order may be interpreted as content including a plurality of pages having a predefined display order.

Figure 4B:
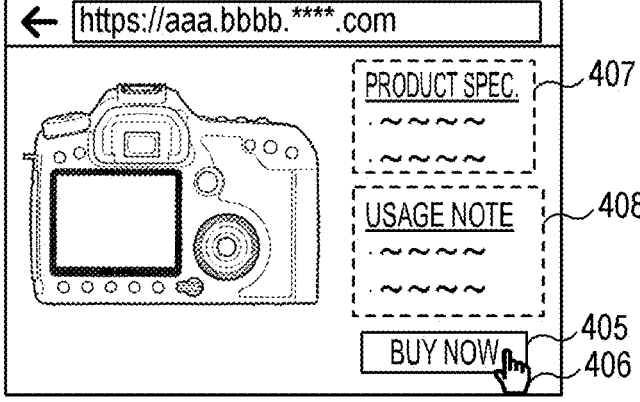

FIG. 4B is a schematic diagram showing an example of a screen displayed on the EVF 29 at step S301 or step S308. The screen of FIG. 4B displays a page of content that is a WEB electronic catalog. The page of FIG. 4B includes object 405. Object 405 is a page-forward object, and link information to the next page on the Internet is associated with object 405. A cursor 406 indicating the user's operation position is placed over the page of FIG. 4B. Each of regions 407 and 408 on the page in FIG. 4B is a predefined determination region. The broken lines indicating the determination regions 407 and 408 are not displayed. In this manner, a plurality of determination regions may be set on one page. When the touchpad of the operation unit 70 is tapped in the state shown in FIG. 4B (a state in which the cursor 406 is placed over the page-forward object 405), the system control unit 50 determines that a page-forward operation has been performed. Even if a page-forward operation is performed, the system control unit 50 does not advance the page to be displayed to the next page unless the line-of-sight condition of the determination region 407 and the line-of-sight condition of the determination region 408 are both satisfied. When a page-forward operation is performed after the line-of-sight condition of the determination region 407 and the line-of-sight condition of the determination region 408 are both satisfied, the system control unit 50 advances the page to be displayed to the next page.

Figure 4C:
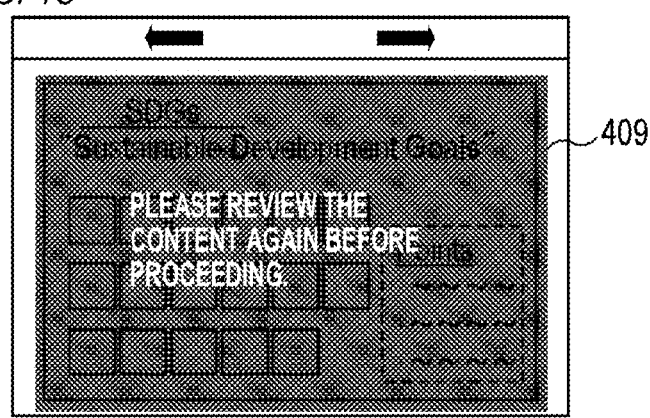

When a page-forward operation is performed before the line-of-sight conditions are satisfied, a predetermined notification is provided at step S307 in FIG. 3. FIG. 4C is a schematic diagram showing an example of a screen displayed on the EVF 29 at step S307. In FIG. 4C, an image 409 indicating the presence of a determination region for which the line-of-sight condition is not satisfied is displayed over the page. The image 409 is displayed only for a few seconds. By looking at the image 409, the user can understand that there is an overlooked section. The method of notification is not particularly limited as long as it can notify the user that there is a determination region for which the line-of-sight condition is not satisfied. For example, the notification may be provided using an image different from the image 409, or may be provided by sound.

Figure 4D:
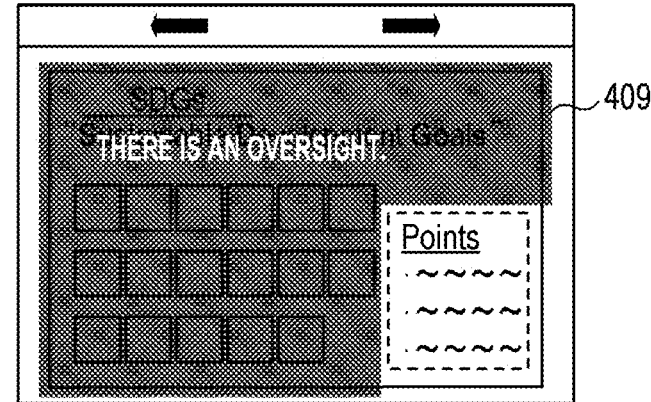

FIG. 4D is a schematic diagram showing an example of a screen displayed on the EVF 29 at step S307. In FIG. 4D, an image 410 indicating the presence of a determination region for which the line-of-sight condition is not satisfied is displaced over the page. The image 410 is displayed only for a few seconds. The image 410 is displayed to indicate the determination region (avoid the determination region). This causes the user to identify the determination region for which the line-of-sight condition is not satisfied. There are no particular limitations on the notification method as long as the user is notified of the determination region for which the line-of-sight condition is not satisfied. For example, the notification may be provided using an image different from the image 410, or may be provided by sound.

As described above, according to the first embodiment, advancing the page to be displayed to the next page is restricted until the line-of-sight condition is satisfied. This allows the viewer to view the content as intended by the content provider. For example, the viewer is caused to view the region that the provider wants the viewer to sufficiently (reliably) view before advancing the page to be displayed to the next page. In the first embodiment, a restriction is imposed so as not to display the next page until the line-of-sight condition is satisfied, but the method of the restriction is not limited to this. For example, the administrator may be asked whether to permit to display the next page in response to a page-forward operation performed in a state in which the line-of-sight condition is not satisfied. It may also be configured to permit the display of the next page when a page-forward operation is repeated a predetermined number of times or more, regardless of whether the line-of-sight condition is satisfied. Any configuration can be adopted as long as the display of the next page is easier when the line-of-sight condition is satisfied.

Second Embodiment

Figure 5:
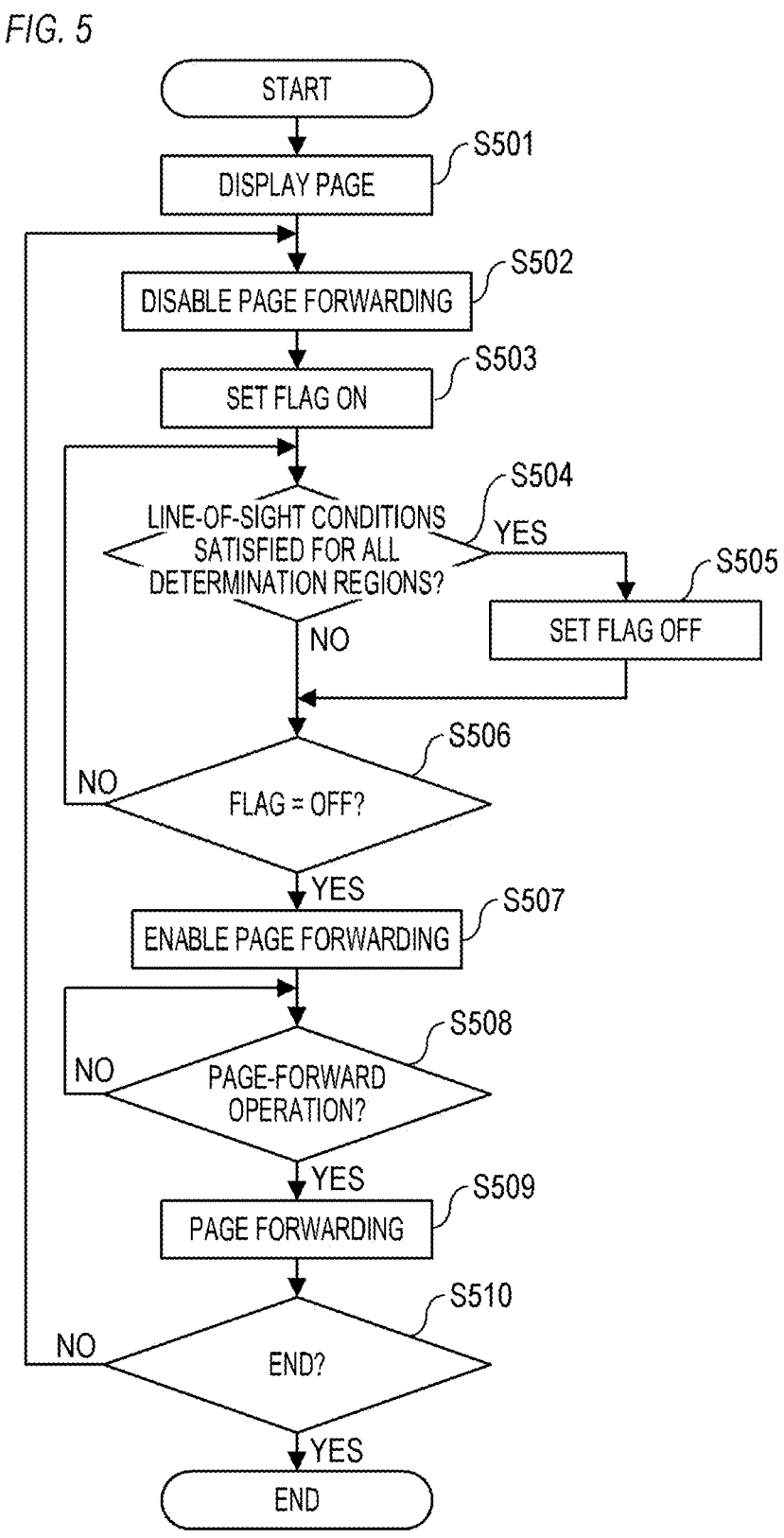
FIG. 5 is a flowchart illustrating an operation example according to a second embodiment.

Referring to FIG. 5, a second embodiment of the present invention is now described. In the first embodiment, even when a page-forward operation is performed, the page to be displayed cannot be advanced to the next page until the line-of-sight condition is satisfied. In the second embodiment, a page-forward operation is disabled until the line-of-sight condition is satisfied.

FIG. 5 is a flowchart showing an example of an operation of the wearable device 10. The process of the flowchart of FIG. 5 is performed when the system control unit 50 loads a program stored in the non-volatile memory 56 into the system memory 52, executes the program, and controls the function blocks. When the user instructs to start displaying content using the operation unit 70, the system control unit 50 starts the operation shown in FIG. 5. The content includes a plurality of pages having a predefined display order. Each page includes a combination of image data written in the memory 32, for example.

At step S501, similarly to step S301 in FIG. 3, the system control unit 50 displays the Nth page of the content on the EVF 29.

At step S502, the system control unit 50 disables a page-forward operation (disablement of a page-forward operation). For example, the system control unit 50 displays the page-forward object in a grayed-out state or hides the page-forward object.

At step S503, similarly to step S302, the system control unit 50 sets the page-forwarding prohibition flag stored in the system memory 52 to ON.

As step S504, similarly to step S303, the system control unit 50 determines whether the line-of-sight conditions of all the determination regions are satisfied for the displayed page. If the line-of-sight conditions of all the determination regions are satisfied, the process proceeds to step S505. If not, the process proceeds to step S506.

At step S505, similarly to step S304, the system control unit 50 sets the page-forwarding prohibition flag stored in the system memory 52 to OFF.

At step S506, similarly to step S306, the system control unit 50 determines whether the page-forwarding prohibition flag stored in the system memory 52 is OFF. If the page-forwarding prohibition flag is OFF, the process proceeds to step S507. If not, the process proceeds to step S504.

At step S507, the system control unit 50 enables a page-forward operation (enablement of a page-forward operation). For example, the system control unit 50 cancels the grayed-out state of the page-forward object or displays the page-forward object.

At step S508, similarly to step S305, the system control unit 50 determines whether a page-forward operation has been performed. The process waits for a page-forward operation to be performed, and proceeds to step S509 when a page-forward operation is performed.

At step S509, similarly to step S308, the system control unit 50 advances the page to be displayed to the next page (page forwarding).

At step S510, similarly to step S309, the system control unit 50 determines whether to end the display of the content. If the display of the content is to be ended, the operation of FIG. 5 ends. If not, the process proceeds to step S502.

As described above, according to the second embodiment, a page-forward operation cannot be performed until the line-of-sight condition is satisfied. This limits an unnecessary page-forward operation that is performed while a region that should be viewed is overlooked.

Third Embodiment

Figure 6:
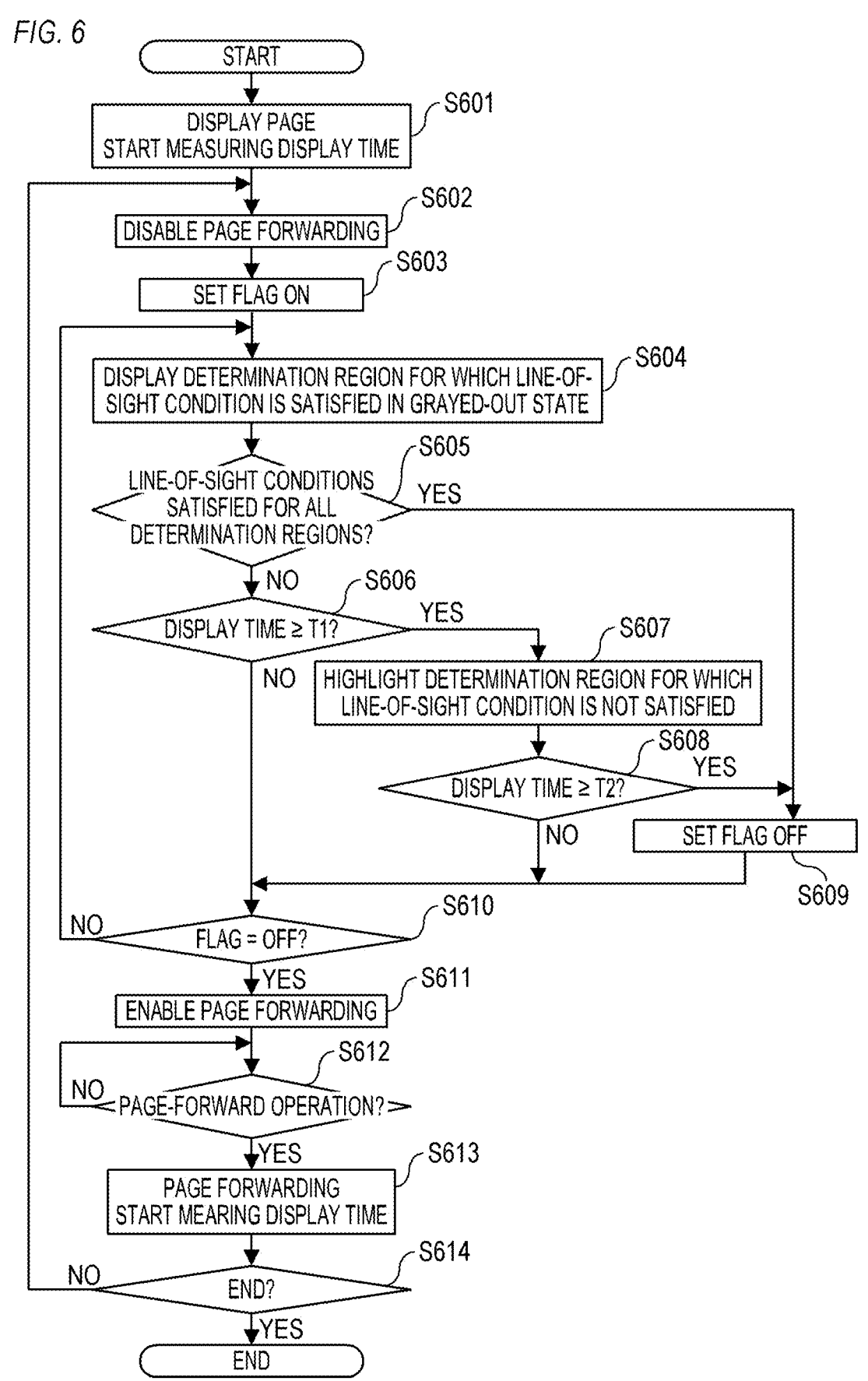
FIG. 6 is a flowchart illustrating an operation example according to a third embodiment.
Figure 7A:
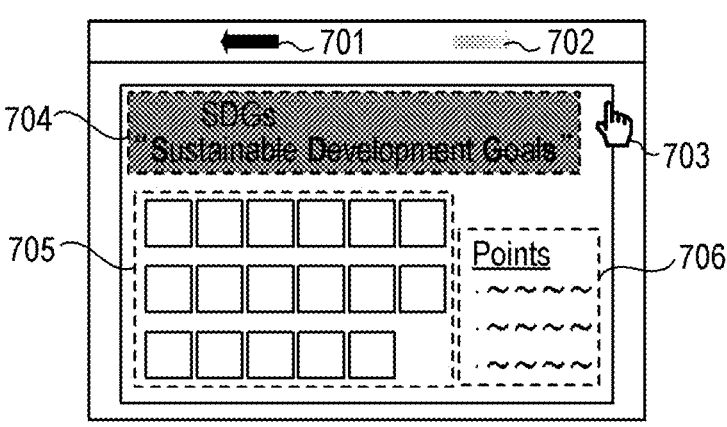
FIGS. 7A and 7B are schematic diagrams illustrating examples of screens according to the third embodiment.
Figure 7B:
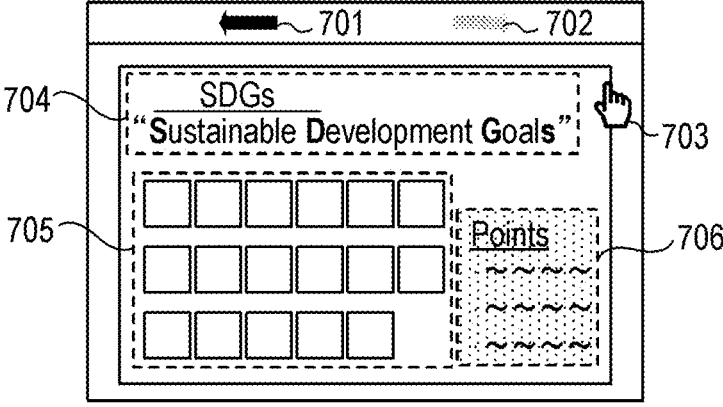

Referring to FIG. 6 and FIGS. 7A, and 7B, a third embodiment of the present invention is now described. In the third embodiment, the saliency of the determination region is changed, and control is performed on the basis of the display time of the page. An example is described in which the second embodiment is modified, but the characteristic operation of the third embodiment may be combined with the first embodiment. The saliency may be interpreted as prominence or visibility.

FIG. 6 is a flowchart showing an example of an operation of the wearable device 10. The process of the flowchart of FIG. 6 is performed when the system control unit 50 loads a program stored in the non-volatile memory 56 into the system memory 52, executes the program, and controls the function blocks. When the user instructs to start displaying content using the operation unit 70, the system control unit 50 starts the operation shown in FIG. 6. The content includes a plurality of pages having a predefined display order. Each page includes a combination of image data written in the memory 32, for example.

At step S601, similarly to step S501 in FIG. 5, the system control unit 50 displays the Nth page of the content on the EVF 29. Also, the system control unit 50 uses the system timer 53 to start measuring the time during which the Nth page is displayed on the EVF 29 (display time of the Nth page).

At step S602, similarly to step S502, the system control unit 50 disables a page-forward operation (disablement of a page-forward operation).

At step S603, similarly to step S503, the system control unit 50 sets the page-forwarding prohibition flag stored in the system memory 52 to ON.

At step S604, the system control unit 50 performs processing for lowering the saliency of the determination region for which the line-of-sight condition is satisfied. For example, the system control unit 50 displays the determination region for which the line-of-sight condition is satisfied in a grayed-out state. This makes the regions that have been viewed by the user less prominent and the regions that have not been viewed by the user more prominent, allowing the user to easily know where to look. In the above description, the processing on the determination region for which the line-of-sight condition is satisfied accentuates the determination region for which the line-of-sight condition is not satisfied in a relative manner, but the present invention is not limited to this. For example, the processing on the determination region for which the line-of-sight condition is satisfied may increase the saliency of the determination region for which the line-of-sight condition is not satisfied (may accentuate the determination region for which the line-of-sight condition is not satisfied). Either the processing on the determination region for which the line-of-sight condition is satisfied or the processing on the determination region for which the line-of-sight condition is not satisfied may be performed, or both may be performed.

At step S605, similarly to step S504, the system control unit 50 determines whether the line-of-sight conditions of all the determination regions are satisfied for the displayed page. If the line-of-sight conditions of all the determination regions are satisfied, the process proceeds to step S609. If not, the process proceeds to step S606.

At step S606, the system control unit 50 determines whether the display time of the current page (the displayed page) has reached a first predetermined time T1. The display time of the current page may be interpreted as the time elapsed since starting the display of the page. If the display time of the current page has reached the first predetermined time T1, the process proceeds to step S607. If not, the process proceeds to step S610.

At step S607, the system control unit 50 notifies the user of the determination region for which the line-of-sight condition is not satisfied. The third embodiment performs processing of increasing the saliency of the determination region for which the line-of-sight condition is not satisfied. For example, the system control unit 50 highlights the determination region for which the line-of-sight condition is not satisfied. This makes the region that has not been viewed by the user more prominent, allowing the user to easily know where to look. At this time, the grayed-out state at step S604 may be canceled. When the display time of the current page reaches the first predetermined time T1 while there is a determination region for which the line-of-sight condition is not satisfied, it is likely that the user does not know where to look. For this reason, the user is notified of the determination region for which the line-of-sight condition is not satisfied.

There are no particular limitations on the notification method. For example, the grayed-out state at step S604 may be maintained, and the determination region for which the line-of-sight condition is not satisfied may be highlighted. This makes regions that have not been viewed by the user more prominent. At step S604, processing for increasing the saliency of a determination region for which the line-of-sight condition is not satisfied may be performed. Then, at step S607, processing for increasing the saliency of the determination region for which the line-of-sight condition is not satisfied may be performed again. At step S607, processing of lowering the saliency may be performed for the determination region for which the line-of-sight condition is satisfied. These also make the region that has not been viewed by the user more prominent. The determination region for which the line-of-sight condition is not satisfied may be notified by sound.

At step S608, the system control unit 50 determines whether the display time of the current page has reached a second predetermined time T2. The second predetermined time T2 is longer than the first predetermined time T1. For example, the second predetermined time T2 is a time that is sufficient for most users to view all of the determination regions. If the display time of the current page has reached the second predetermined time T2, the process proceeds to step S609. If not, the process proceeds to step S610. When the display time of the current page reaches the second predetermined time T2 while a determination region for which the line-of-sight condition is not satisfied is determined to be present, it is likely that the user has sufficiently viewed the page (all determination regions). As such, the process proceeds to step S609 so that the page to be displayed can be advanced to the next page.

At step S609, similarly to step S505, the system control unit 50 sets the page-forwarding prohibition flag stored in the system memory 52 to OFF.

At step S610, similarly to step S506, the system control unit 50 determines whether the page-forwarding prohibition flag stored in the system memory 52 is OFF. If the page-forwarding prohibition flag is OFF, the process proceeds to step S611. If not, the process proceeds to step S604.

At step S611, similarly to step S507, the system control unit 50 enables a page-forward operation (enablement of a page-forward operation).

At step S612, similarly to step S508, the system control unit 50 determines whether a page-forward operation has been performed. The process waits for a page-forward operation to be performed, and proceeds to step S613 when a page-forward operation is performed.

At step S613, similarly to step S509, the system control unit 50 advances the page to be displayed to the next page (page forwarding). Furthermore, the system control unit 50 uses the system timer 53 to start measuring the time during which the next page (the page to be newly displayed) is displayed on the EVF 29 (the display time of the next page).

At step S614, similarly to step S510, the system control unit 50 determines whether to end the display of the content. If the display of the content is to be ended, the operation of FIG. 6 ends. If not, the process proceeds to step S602.

FIGS. 7A and 7B are schematic diagrams illustrating examples of screens according to the third embodiment.

FIG. 7A is a schematic diagram showing an example of a screen displayed on the EVF 29 at step S604 in FIG. 6. The screen in FIG. 7A displays a content page. The page of FIG. 7A includes a page-back object 701 and a page-forward object 702. A cursor 703 indicating the user's operation position is placed over the page of FIG. 7A. As a result of the processing at step S602, the page-forward object 702 is grayed out. Each of regions 704, 705, and 706 on the page of FIG. 7A is a predefined determination region. The broken lines indicating the determination regions 704 to 706 are not displayed. It is assumed that the line-of-sight condition of the determination region 704 is satisfied, whereas the determination conditions of the determination regions 705 and 706 are not satisfied. The determination region 704 for which the line-of-sight condition is satisfied is displayed in a grayed-out state. As a result, the region that has been viewed by the user is less prominent, and the regions that have not been viewed by the user become more prominent, so that the user's line of sight is naturally directed to a region that has not been viewed by the user.

FIG. 7B is a schematic diagram showing an example of a screen displayed on the EVF 29 at step S607 in FIG. 6. In a similar manner as FIG. 7A, the screen of FIG. 7B displays a content page. The page of FIG. 7B includes a page-back object 701 and a page-forward object 702. A cursor 703 is placed over the page of FIG. 7B. As a result of the processing at step S602, the page-forward object 702 is grayed out. The page of FIG. 7B includes determination regions 704 to 706. It is assumed that the line-of-sight conditions of the determination regions 704 and 705 are satisfied, but the determination condition of the determination region 706 is not satisfied. The determination region 706 for which the line-of-sight condition is not satisfied is displayed in a highlighted manner. As a result, the region that has not been viewed by the user is more prominent, so that a line of sight is naturally directed to the region that has not been viewed by the user.

As described above, according to the third embodiment, the saliency of the determination region is appropriately changed. This allows the user to easily know where to look. Furthermore, when the display time of the page is long, the page to be displayed can be advanced to the next page. Thus, a situation is unlikely to occur where the page to be displayed cannot be advanced to the next page even if the user has sufficiently viewed the page.

Fourth Embodiment

Referring to FIG. 8, FIGS. 9A to 9G, and FIGS. 10A to 10C, a fourth embodiment of the present invention is now described. The fourth embodiment changes processing depending on the viewing mode.

Figure 8:
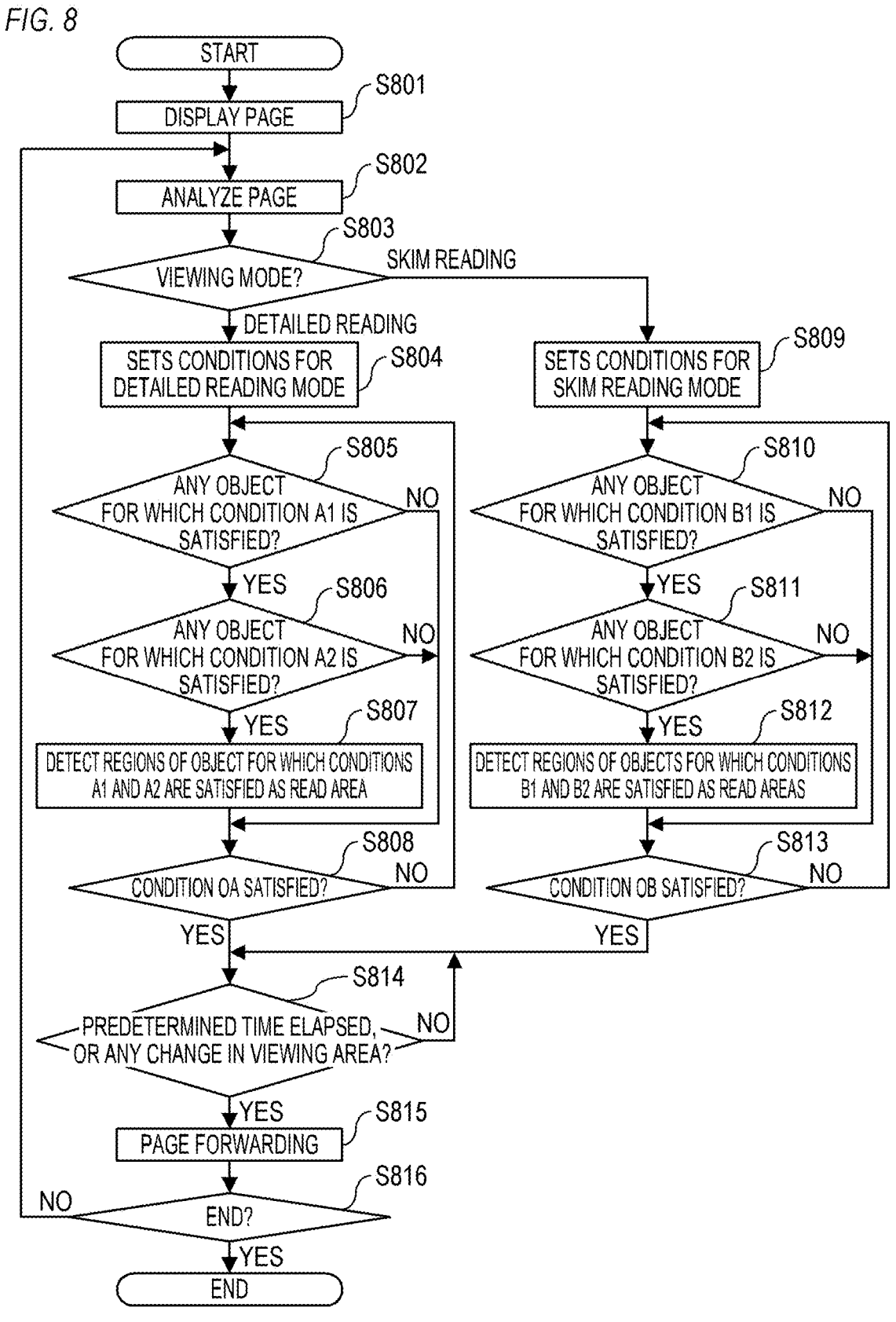
FIG. 8 is a flowchart illustrating an operation example according to a fourth embodiment.

FIG. 8 is a flowchart showing an example of an operation of the wearable device 10. The process of the flowchart of FIG. 8 is performed when the system control unit 50 loads a program stored in the non-volatile memory 56 into the system memory 52, executes the program, and controls the function blocks. When the user instructs to start displaying content using the operation unit 70, the system control unit 50 starts the operation shown in FIG. 8. The content includes a plurality of pages having a predefined display order. Each page includes a combination of image data written in the memory 32, for example.

At step S801, the system control unit 50 displays the Nth page of the content on the EVF 29.

At step S802, the system control unit 50 uses the display-content analysis unit 171 to analyze the displayed page. For example, under the control of the system control unit 50, the display-content analysis unit 171 obtains (downloads) content information using the communication unit 54, and detects the type, number, size, and position of objects such as illustrations, photographs, diagrams, or tables that are displayed. The analysis method and the information obtained by the analysis are not limited to those described above. The analysis may include image processing such as template matching.

At step S803, the system control unit 50 determines whether the viewing mode is a detailed reading mode or a skim reading mode. If the mode is the detailed reading mode, the process proceeds to step S804, If the mode is the skim reading mode, the process proceeds to step S809. A viewing mode other than the detailed reading mode and the skim reading mode may also be set.

At step S804, the system control unit 50 sets line-of-sight conditions A and an object-detection-number condition OA corresponding to the detailed reading mode. The line-of-sight conditions A include a viewing-area condition A1 and a line-of-sight position condition A2. The object-detection-number condition OA may be interpreted as part of the line-of-sight conditions A. The viewing-area condition A1 is a condition that at least a part of the viewing area (a part or the entire viewing area) is within a first determination area RA1. The viewing area is detected by the user-state determination unit 165. The line-of-sight position condition A2 is a condition that the line-of-sight position is within a second determination area RA2. The line-of-sight position is detected by the eyeball-detecting unit 161. The first and second determination areas RA1 and RA2 are each set on the basis of the size and position of the object. When the displayed page includes a plurality of objects, the viewing-area condition A1 and the line-of-sight position condition A2 are set for each of these objects. The settings of the viewing-area condition A1 and the line-of-sight position condition A2 may be interpreted as the settings of the first determination area RA1 and the second determination area RA2. The object-detection-number condition OA is a condition that the number of objects (object regions) for which the viewing-area condition A1 and the line-of-sight position condition A2 are satisfied is greater than or equal to a predetermined number (greater than or equal to a predetermined number NA). The setting of the object-detection-number condition OA may be interpreted as the setting of a predetermined number NA.

At step S805, the system control unit 50 determines whether there is an object for which the viewing-area condition A1 is satisfied. If there is an object for which the viewing-area condition A1 is satisfied, the process proceeds to step S806. If not, the process proceeds to step S808.

At step S806, the system control unit 50 determines whether there is an object for which the viewing-area condition A2 is satisfied. If there is an object for which the viewing-area condition A2 is satisfied, the process proceeds to step S807. If not, the process proceeds to step S808.

At step S807, the system control unit 50 uses the read-area detection unit 172 to detect (set) the region (area) of the object for which the viewing-area condition A1 and the line-of-sight position condition A2 are satisfied as a read area.

At step S808, the system control unit 50 determines whether the object-detection-number condition OA is satisfied. This determination is to determine whether the number of read areas on the displayed page (the number of objects for which the viewing-area condition A1 and the line-of-sight position condition A2 are satisfied) is greater than or equal to the predetermined number NA. If the object-detection-number condition OA is satisfied, the process proceeds to step S814. If not, the process proceeds to step S805.

At step S809, the system control unit 50 sets line-of-sight conditions B and an object-detection-number condition OB corresponding to the skim reading mode. The line-of-sight conditions B include a viewing-area condition B1 and a line-of-sight position condition B2. The object-detection-number condition OB may be interpreted as part of the line-of-sight conditions B. The viewing-area condition B1 is a condition that at least a part of the viewing area (a part or the entire viewing area) is within a first determination region RB1. The line-of-sight position condition B2 is a condition that the line-of-sight position is within a second determination region RB2. The first and second determination areas RB1 and RB2 are each set on the basis of the size and position of the object. When the displayed page includes a plurality of objects, the viewing-area condition B1 and the line-of-sight position condition B2 are set for each of these objects. The settings of the viewing-area condition B1 and the line-of-sight position condition B2 may be interpreted as the settings of the first determination area RB1 and the second determination area RB2. The object-detection-number condition OB is a condition that the number of objects (object regions) for which the viewing-area condition B1 and the line-of-sight position condition B2 are satisfied is greater than or equal to a predetermined number NB. The setting of the object-detection-number condition OB may be interpreted as the setting of the predetermined number NB.

In the skim reading mode, page forwarding (switching to the next page) is performed with a condition that is more lenient than in the detailed reading mode. For example, the first determination region RB1 may be set as an area larger than the first determination area RA1. The second determination area RB2 may be set as an area larger than the second determination area RA2. The predetermined number NB may be set to a number less than the predetermined number NA.

At step S810, the system control unit 50 determines whether there is an object for which the viewing-area condition B1 is satisfied. If there is an object for which the viewing-area condition B1 is satisfied, the process proceeds to step S811. If not, the process proceeds to step S813.

At step S811, the system control unit 50 determines whether there is an object for which the line-of-sight position condition B2 is satisfied. If there is an object for which the line-of-sight position condition B2 is satisfied, the process proceeds to step S812. If not, the process proceeds to step S813.

At step S812, the system control unit 50 uses the read-area detection unit 172 to detect (set) the region (area) of the object for which the viewing-area condition B1 and the line-of-sight position condition B2 are satisfied as the read area.

At step S813, the system control unit 50 determines whether the object-detection-number condition OB is satisfied. This determination is to determine whether the number of read areas on the displayed page (the number of objects for which the viewing-area condition B1 and the line-of-sight position condition B2 are satisfied) is greater than or equal to the predetermined number NB. If the object-detection-number condition OB is satisfied, the process proceeds to step S814. If not, the process proceeds to step S810.

At step S814, the system control unit 50 determines whether a predetermined time has elapsed or whether there has been a change in the viewing area. For example, time measurement starts at the timing when the object-detection-number condition OA or the object-detection-number condition OB is satisfied. The process waits for the predetermined time to elapse or for a change in the viewing area to occur, and the process proceeds to step S815 when the predetermined time has elapsed or the viewing area changes.

At step S815, the system control unit 50 advances the page to be displayed to the next page (page forwarding). The method of page forwarding may differ depending on the viewing mode. In the detailed reading mode, page forwarding may be performed for each page of the content. In the skim reading mode, page forwarding may be performed for some pages (representative pages) of the content. For example, in the detailed reading mode, the page to be displayed may be advanced to the next page, whereas in the skim reading mode, the page to be displayed may be advanced by five pages.

At step S816, the system control unit 50 determines whether to end the display of the content.

Figure 9A:
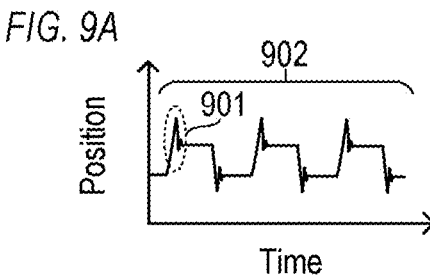
FIGS. 9A to 9G are schematic diagrams for illustrating specific examples of operations according to the fourth embodiment.
Figure 9B:
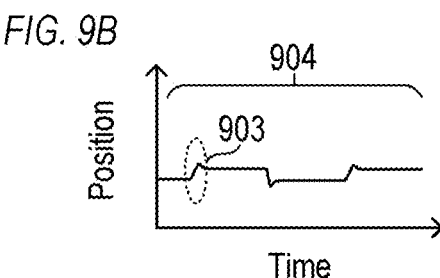

FIGS. 9A to 9G are schematic diagrams for illustrating specific examples of operations according to the fourth embodiment. FIGS. 9A and 9B are schematic diagrams showing examples of microsaccade information obtained by the eyeball-detecting unit 161 (event-data calculation unit 164). FIGS. 9C to 9G are schematic diagrams showing screen examples.

FIG. 9A is a graph showing an example of a microsaccade waveform in a situation where the viewing area is relatively large. FIG. 9B is a graph showing an example of a micro-saccade waveform in a situation where the viewing area is relatively small. In FIGS. 9A and 9B, the vertical axis indicates the pupil center position (the rotation angle of the eyeball around the center of the eyeball), and the horizontal axis indicates time. A microsaccade waveform indicates changes in the pupil center position that occur when microsaccades occur. Section 901 (FIG. 9A) and section 903 (FIG. 9B) of the microsaccade waveforms correspond to the timings at which the microsaccades occur. As shown in FIG. 9A, the amplitude of microsaccades tends to be greater when the viewing area is larger, and the vibrational characteristic of microsaccades tends to be greater (the attenuation rate tends to be lower) when the viewing area is larger. Furthermore, as can be seen from the six microsaccades occurring in period 902, a larger viewing area tends to increase the frequency of microsaccades. Also, as shown in FIG. 9B, a smaller viewing area tends to reduce the amplitude of microsaccades and reduce the vibrational characteristic (increase the attenuation rate) of microsaccades. Furthermore, as can be seen from the fact that only three microsaccades occur in period 904, which is the same length as period 902, a smaller viewing area tends to reduce the frequency of microsaccades. These tendencies (tendency of microsaccades to increase with an increase in the viewing area) allow the size (extent) of the viewing area to be estimated from the amplitude or frequency of microsaccades.

Figure 9C:
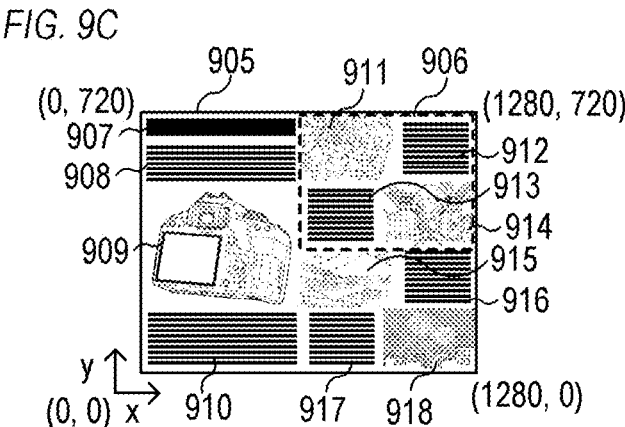

FIG. 9C is a schematic diagram showing an example of screen displayed on the EVF 29 at step S801 or step S815 in FIG. 8. The screen of FIG. 9C displays a page 905 of content including non-text information including illustrations, photographs, diagrams, and tables, such as in a magazine or comic book. Region 906 (region surrounded by a broken line) is a partial region of the page 905. Objects 907 to 918 are objects such as a photograph, a heading, or a sentence on the page 905. There are no particular limitations on the resolution of the page 905. In this example, the coordinates (horizontal position x, vertical position y) of the lower left corner of the page 905 are (0, 0), and the coordinates of the upper right corner are (1280, 720).

Figure 9D:
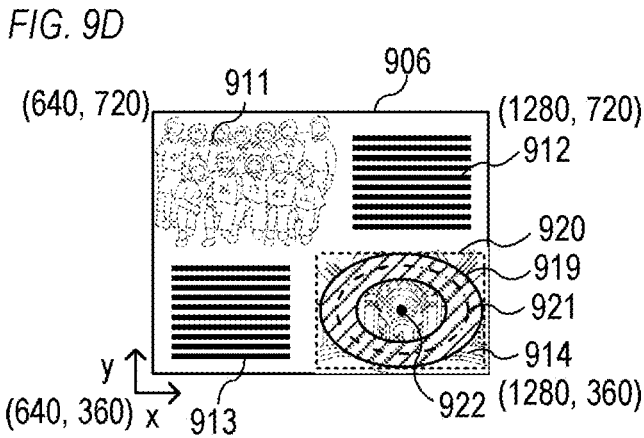

FIG. 9D is a schematic diagram showing region 906, and shows an example in which the detailed reading mode is set. Area 919 (hatched area) is the first determination area RA1 corresponding to object 914, and area 920 (area surrounded by a broken line) is the second determination area RA2 corresponding to object 914. The second determination area 920 is an area (region) having four corners at coordinates (960, 380), (960, 500), (1260, 380), and (1260, 500). Area 921 (area surrounded by a dashed dotted line) is the user's viewing area, and position 922 is the user's line-of-sight position. The coordinates of the line-of-sight position 922 are assumed to be (1020, 450). Since a part of the viewing area 921 is included in the first determination area 919, the viewing-area condition A1 is satisfied. Since the line-of-sight position 922 is included in the second determination area 920, the line-of-sight position condition A2 is also satisfied. Accordingly, at step S807, the region (area) of object 914 is detected as a read area.

Figure 9E:
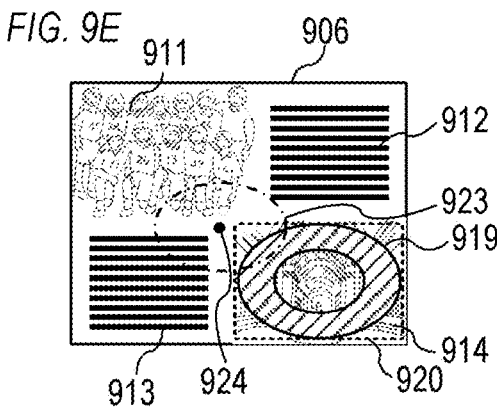

FIG. 9E is a schematic diagram showing region 906, and shows an example in which the detailed reading mode is set. Area 923 is the user's viewing area, and position 924 is the user's line-of-sight position. The coordinates of the line-of-sight position 924 are assumed to be (900, 540). Since a part of the viewing area 923 is included in the first determination area 919, the viewing-area condition A1 is satisfied. However, since the line-of-sight position 924 is not included in the second determination area 920, the line-of-sight position condition A2 is not satisfied. Thus, at step S807, the region (area) of object 914 is not detected as a read area.

Figure 9F:
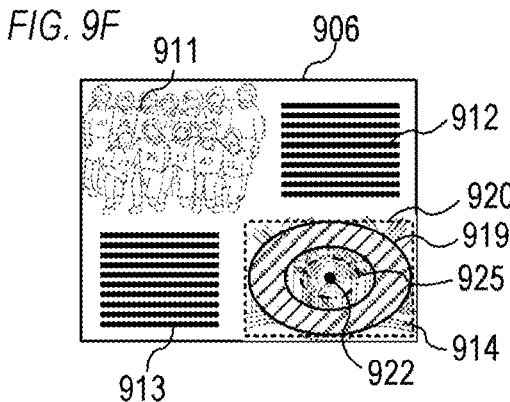

FIG. 9F is a schematic diagram showing region 906, and shows an example in which the detailed reading mode is set. Area 925 is the user's viewing area. The user's line-of-sight position is position 922. As in FIG. 9D, since the line-of-sight position 922 is included in the second determination area 920, line-of-sight position condition A2 is satisfied. However, since the viewing area 925 is not included in the first determination area 919, the viewing-area condition A1 is not satisfied. Thus, at step S807, the region (area) of object 914 is not detected as a read area.

Figure 9G:
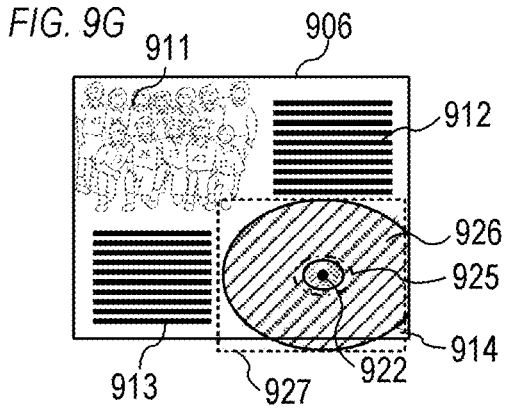

FIG. 9G is a schematic diagram showing region 906, and shows an example in which the skim reading mode is set. Area 926 is the first determination area RB1 corresponding to object 914, and area 927 is the second determination area RB2 corresponding to object 914. The second determination area 927 is assumed to be an area (region) having four corners at coordinates (850, 300), (850, 580), (1280, 300), and (1280, 580). The user's viewing area is area 925, and the user's line-of-sight position is position 922. Since a part of the viewing area 925 is included in the first determination area 926, the viewing-area condition B1 is satisfied. Furthermore, since the line-of-sight position 922 is included in the second determination area 927, the line-of-sight position condition B2 is also satisfied. Accordingly, at step S812, the region (area) of object 914 is detected as a read area.

Figure 10A:
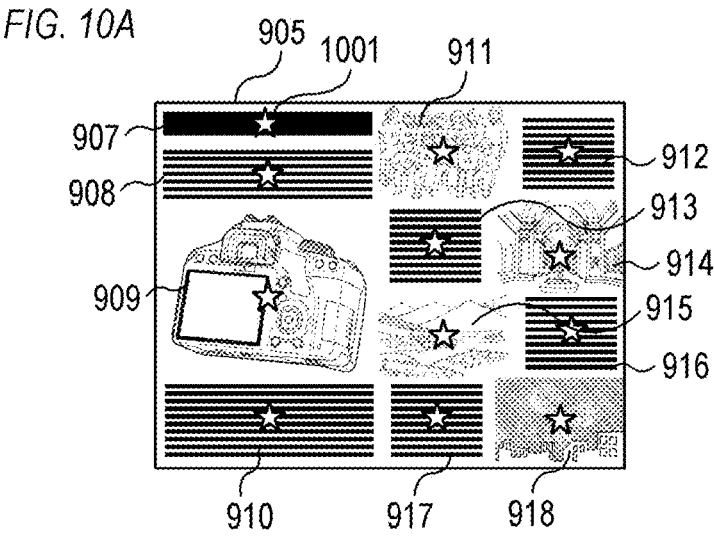
FIGS. 10A to 10C are schematic diagrams illustrating screen examples according to the fourth embodiment.
Figure 10B:
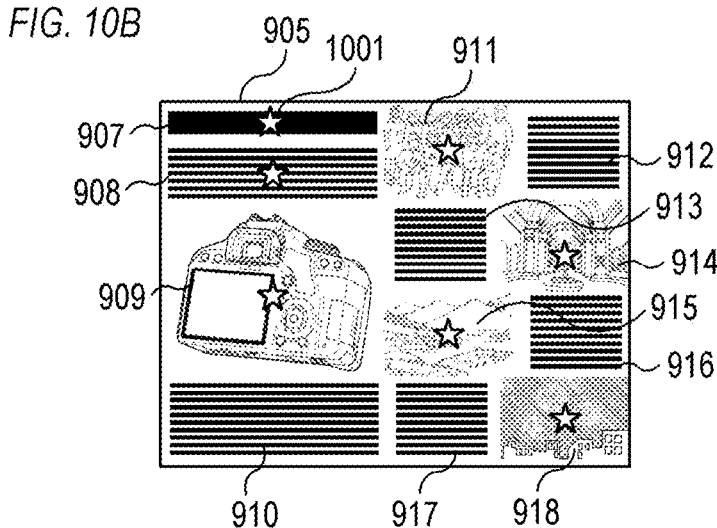
Figure 10C:
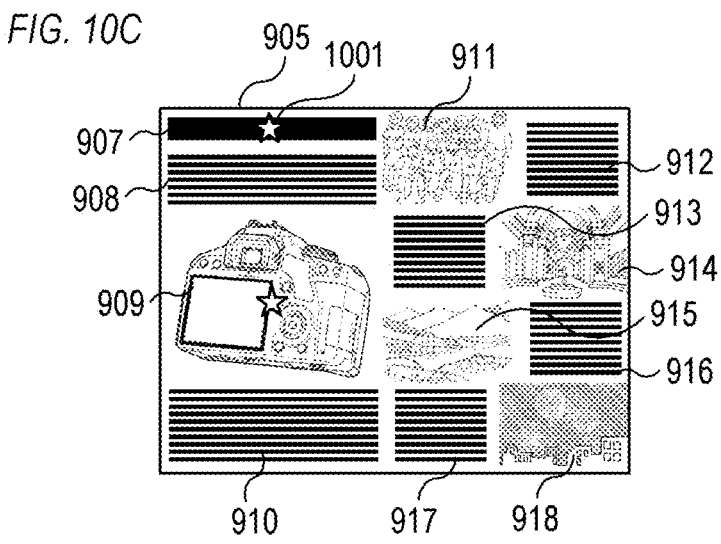

FIGS. 10A to 10C are schematic diagrams illustrating screen examples according to the fourth embodiment. FIGS. 10A to 10C are schematic diagrams showing an example of screen displayed on the EVF 29 at step S801 or step S815 in FIG. 8. The screens of FIGS. 10A to 10C display the page 905 described above. As mentioned above, the page 905 includes twelve objects 907 to 918. In FIGS. 10A to 10C, a chapter is considered as one object, but each line of text may also be considered as one object. Star marks 1001 indicate objects that are detected as read areas. The star marks 1001 may or may not be displayed. Other techniques may be used to indicate objects that are detected as read areas. There are no particular limitations on the predetermined number NA, which is the threshold of the object-detection-number condition OA in the detailed reading mode, and the predetermined number NB, which is the threshold of the object-detection-number condition OB in the skim reading mode. This example assumes that the predetermined number NA is 12 and the predetermined number NB is 6. As such, the object-detection-number condition OA is a condition that all objects are detected as objects in read areas, and the object-detection-number condition OB is a condition that half of the objects are detected as objects in read areas.

In FIG. 10A, 12 objects are all detected as objects in read areas. Both the object-detection-number condition OA and the object-detection-number condition OB are satisfied. Thus, in either the detailed reading mode (step S808) or the skim reading mode (step S813), it is determined that viewing of the page 905 is complete (the page 905 has been sufficiently viewed), and the process proceeds to step S814.

In FIG. 10B, seven objects are detected as objects in read areas. The object-detection-number condition OB is satisfied, but the object-detection-number condition OA is not satisfied. Thus, in the skim reading mode (step S813), it is determined that viewing of the page 905 is complete, and the process proceeds to step S814. However, in the detailed reading mode (step S808), it is determined that viewing of the page 905 is not complete (the page 905 has not been sufficiently viewed), and the process proceeds to step S805.

In FIG. 10C, two objects are detected as objects in read areas. Neither the object-detection-number condition OA nor the object-detection-number condition OB is satisfied. As such, in both the detailed reading mode (step S808) and the skim reading mode (step S813), it is determined that viewing of the page 905 is not complete. In the detailed reading mode, the process proceeds to step S805. In the skim reading mode, the process proceeds to step S810.

As described above, according to the fourth embodiment, the process is changed depending on the viewing mode, so that the user can view the content in a manner that is desirable for the user, thereby improving convenience. Furthermore, since the page to be displayed is automatically changed to the next page in response to a lapse of the predetermined time or a change in the viewing area, the need for the user to operate the operation member can be eliminated, thereby improving convenience.

Note that the above-described various types of control may be processing that is carried out by one piece of hardware (e.g., processor or circuit), or otherwise. Processing may be shared among a plurality of pieces of hardware (e.g., a plurality of processors, a plurality of circuits, or a combination of one or more processors and one or more circuits), thereby carrying out the control of the entire device.

Also, the above processor is a processor in the broad sense, and includes general-purpose processors and dedicated processors. Examples of general-purpose processors include a central processing unit (CPU), a micro processing unit (MPU), a digital signal processor (DSP), and so forth. Examples of dedicated processors include a graphics processing unit (GPU), an application-specific integrated circuit (ASIC), a programmable logic device (PLD), and so forth. Examples of PLDs include a field-programmable gate array (FPGA), a complex programmable logic device (CPLD), and so forth.

The embodiment described above (including variation examples) is merely an example. Any configurations obtained by suitably modifying or changing some configurations of the embodiment within the scope of the subject matter of the present invention are also included in the present invention. The present invention also includes other configurations obtained by suitably combining various features of the embodiment.

According to the present invention, it is possible to cause a viewer of content to view the content in accordance with the intention of the content provider.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-147493, filed on Sep. 12, 2023, which is hereby incorporated by reference herein in its entirety.

What is claimed is:

1. An electronic device comprising:
a processor; and
a memory storing a program which, when executed by the processor, causes the electronic device to
perform display processing in which any one of a plurality of pages included in content is displayed,
perform obtainment processing in which line-of-sight information relating to a user looking at the displayed page is obtained, and
perform control processing in which
control is performed to provide a first notification prompting the user to confirm a displayed page and to not advance a page to be displayed to a next page, in a case where an operation for advancing the page to be displayed to the next page is performed by the user before a condition regarding a line of sight based on the line-of-sight information obtained by the obtainment processing is satisfied,
control is performed to provide a second notification that differs from the first notification, the second notification being a notification in which a region on the displayed page where the condition regarding the line of sight is not satisfied is highlighted, in a case where a first predetermined time has elapsed since starting to display the page before the condition regarding the line of sight is satisfied, and
control is performed to advance the page to be displayed to the next page, in a case where the operation is performed after the condition regarding the line of sight is satisfied.

2. The electronic device according to claim 1, wherein the condition regarding the line of sight is set for a partial region of the displayed page.

3. The electronic device according to claim 1, wherein
a plurality of conditions respectively regarding a plurality of line of sights respectively corresponding to a plurality of regions on the displayed page are set, and
in the control processing, control is performed to provide the first notification in a case where the operation is performed by the user before the plurality of conditions respectively regarding the plurality of line of sights are is satisfied.

4. The electronic device according to claim 3, wherein the plurality of regions do not overlap.

5. The electronic device according to claim 3, wherein the plurality of conditions regarding the plurality of line of sights includes a condition under which one of the line of sights is directed to a predetermined region.

6. The electronic device according to claim 3, wherein the plurality of conditions regarding the plurality of line of sights includes a condition under which a total time during which one of the line of sights is directed to a predetermined region is greater than or equal to a second predetermined time.

7. The electronic device according to claim 3, wherein the plurality of conditions regarding the plurality of line of sights includes a condition under which a time during which one of the line of sights is continuously directed to a predetermined region is greater than or equal to a second predetermined time.

8. The electronic device according to claim 3, wherein the plurality of conditions regarding the plurality of line of sights includes a condition under which a predetermined region receives attention.

9. The electronic device according to claim 3, wherein in the control processing, control is performed to change a display manner of a region for which the condition regarding the line of sight is satisfied in a case where the operation is performed by the user before the plurality of conditions regarding the line of sights are satisfied, and control is performed to change a display manner of a region for which the condition regarding the line of sight is not satisfied in a case where a first predetermined time has elapsed since starting to display the page before the plurality of conditions regarding the line of sights are satisfied.

10. The electronic device according to claim 3, wherein in the control processing, control is performed to change a display manner of a region for which the condition regarding the line of sight is satisfied.

11. The electronic device according to claim 3, wherein in the control processing, control is performed to display an image indicating presence of a region, for which the condition regarding the line of sight is not satisfied, over a region for which the condition regarding the line of sight is satisfied.

12. The electronic device according to claim 1, wherein a plurality of conditions respectively regarding a plurality of line of sights respectively corresponding to a plurality of regions on the displayed page are set, and in the control processing, control is performed to provide the first notification in a case where the operation is performed by the user before the conditions regarding the line of sights corresponding to a predetermined number or more of regions among the plurality of regions are satisfied.

13. The electronic device according to claim 12, wherein any one of a plurality of modes including a first mode and a second mode is settable, and in the control processing, control is performed to provide the first notification in a case where the operation is performed by the user before the conditions regarding the line of sights corresponding to a first predetermined number or more of regions are satisfied in the first mode, and control is performed to provide the first notification in a case where the operation is performed by the user before the conditions regarding the line of sights corresponding to a second predetermined number or more of regions are satisfied in the second mode, the second predetermined number being different from the first predetermined number.

14. The electronic device according to claim 1, wherein the operation is a tap operation, by the user, on a predetermined region of a display.

15. The electronic device according to claim 1, wherein the first notification includes a notification of a region for which the condition regarding the line of sight is not satisfied.

16. The electronic device according to claim 1, wherein the electronic device is a head-mounted display.

17. The electronic device according to claim 1, wherein the operation is a touch operation on an object on the displayed page, the object being used to advance the page to be displayed to the next page.

18. The electronic device according to claim 17, wherein the object is displayed on the displayed page in a case where the condition regarding the line of sight is satisfied.

19. A control method of an electronic device, comprising:

displaying any one of a plurality of pages included in content;

obtaining line-of-sight information relating to a user looking at the displayed page; and performing control to provide a first notification prompting the user to confirm a displayed page and to not advance a page to be displayed to a next page, in a case where an operation for advancing the page to be displayed to the next page is performed by the user before a condition regarding a line of sight based on the obtained line-of-sight information is satisfied;

performing control to provide a second notification that differs from the first notification, the second notification being a notification in which a region on the displayed page where the condition regarding the line of sight is not satisfied is highlighted, in a case where a first predetermined time has elapsed since starting to display the page before the condition regarding the line of sight is satisfied; and performing control to advance the page to be displayed to the next page, in a case where the operation is performed after the condition regarding the line of sight is satisfied.

20. A non-transitory computer readable medium that stores a program, wherein the program causes a computer to execute a control method of an electronic device, the control method comprising:

displaying any one of a plurality of pages included in content;

obtaining line-of-sight information relating to a user looking at the displayed page; and performing control to provide a first notification prompting the user to confirm a displayed page and to not advance a page to be displayed to a next page, in a case where an operation for advancing the page to be displayed to the next page is performed by the user before a condition regarding a line of sight based on the obtained line-of-sight information is satisfied;

performing control to provide a second notification that differs from the first notification, the second notification being a notification in which a region on the displayed page where the condition regarding the line of sight is not satisfied is highlighted, in a case where a first predetermined time has elapsed since starting to display the page before the condition regarding the line of sight is satisfied; and performing control to advance the page to be displayed to the next page, in a case where the operation is performed after the condition regarding the line of sight is satisfied.

* * * * *